(12) United States Patent
Perrow

(10) Patent No.: US 6,443,844 B1
(45) Date of Patent: Sep. 3, 2002

(54) CONSTANT VELOCITY STROKING JOINT

(75) Inventor: Scott Jay Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/730,485

(22) Filed: Dec. 5, 2000

(51) Int. Cl.[7] ............................................. F16D 3/224
(52) U.S. Cl. ........................ 464/145; 464/167; 464/906
(58) Field of Search ................................ 464/145, 146, 464/167, 906; 384/49; 180/384, 385

(56) References Cited

U.S. PATENT DOCUMENTS

| | | | | |
|---|---|---|---|---|
| 1,665,280 A | * | 4/1928 | Rzeppa | 464/145 |
| 1,690,714 A | * | 11/1928 | Braddock | 464/167 |
| 3,310,960 A | * | 3/1967 | Cull | 464/145 |
| 4,991,981 A | * | 2/1991 | Baxter | 384/49 X |
| 5,542,515 A | * | 8/1996 | Richardson et al. | 192/44 |
| 6,251,021 B1 | * | 6/2001 | Jacob | 464/906 X |

\* cited by examiner

Primary Examiner—Greg Binda
(74) Attorney, Agent, or Firm—Edmund P. Anderson

(57) ABSTRACT

A Rzeppa-type ball spline constant velocity joint includes an outer race, an inner race, and an intermediate race disposed between the inner and outer races and supporting the inner race for angular pivotal movement. The intermediate race and outer race are formed with aligned axial ball channels. A plurality of rows of spline balls are supported by a ball spline cage between the intermediate race and the outer race and extend beyond the ends of the intermediate race to provide free rolling support of the intermediate race along the full limits of the axial stroke of the intermediate race within the outer race.

14 Claims, 5 Drawing Sheets

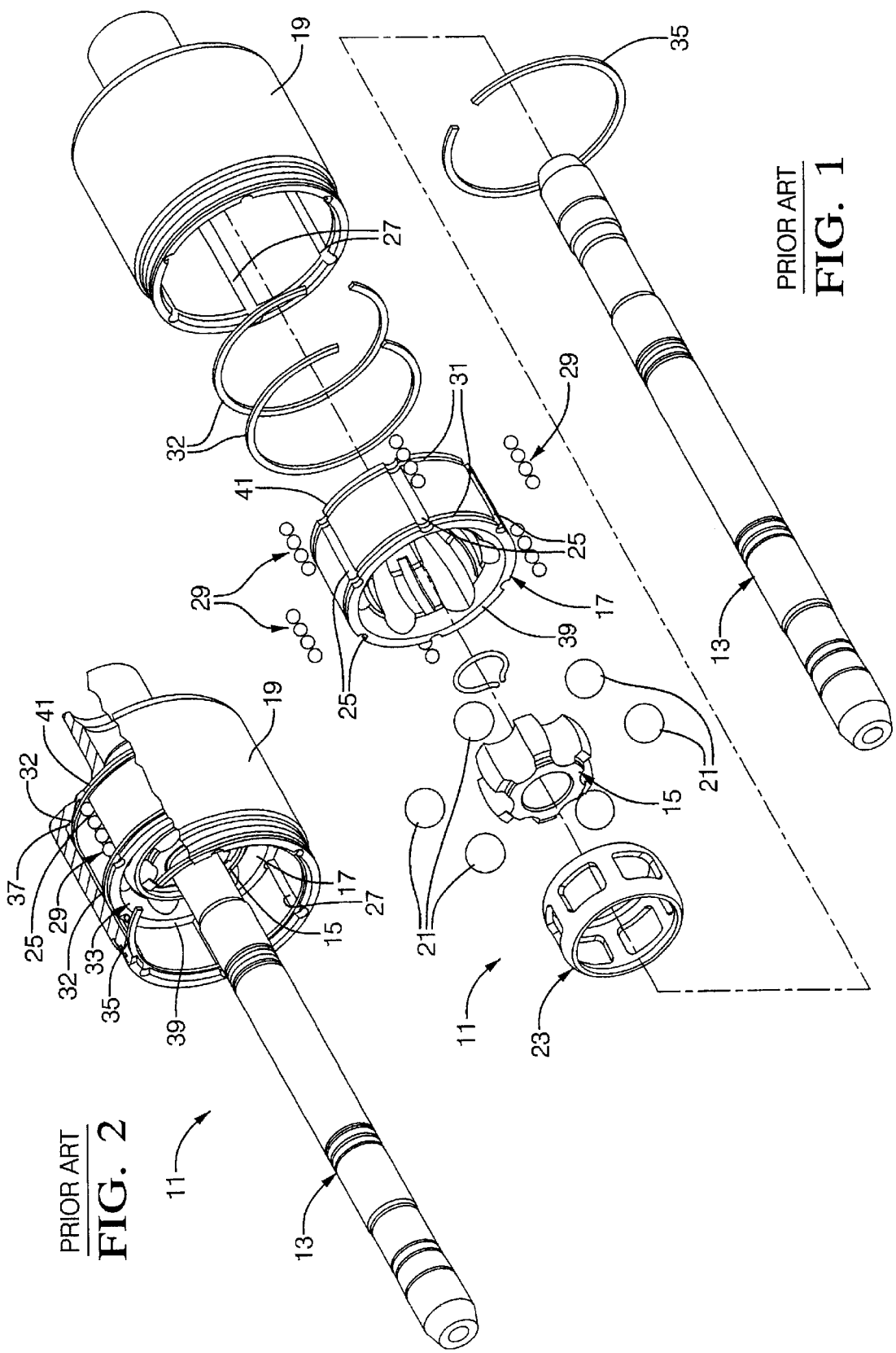

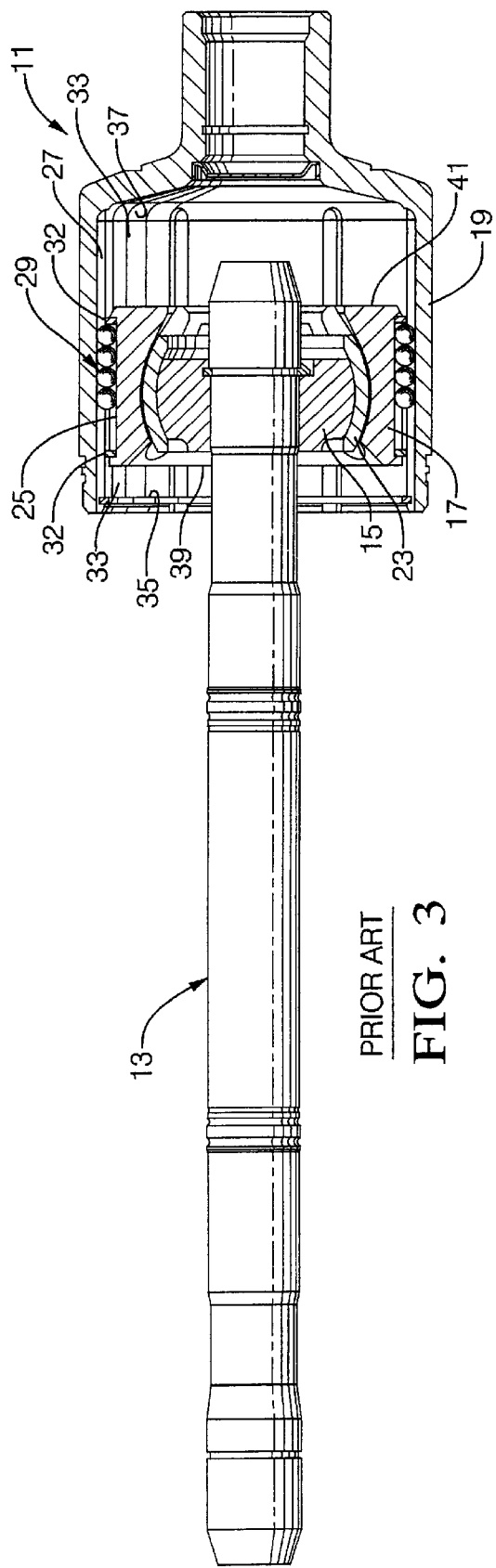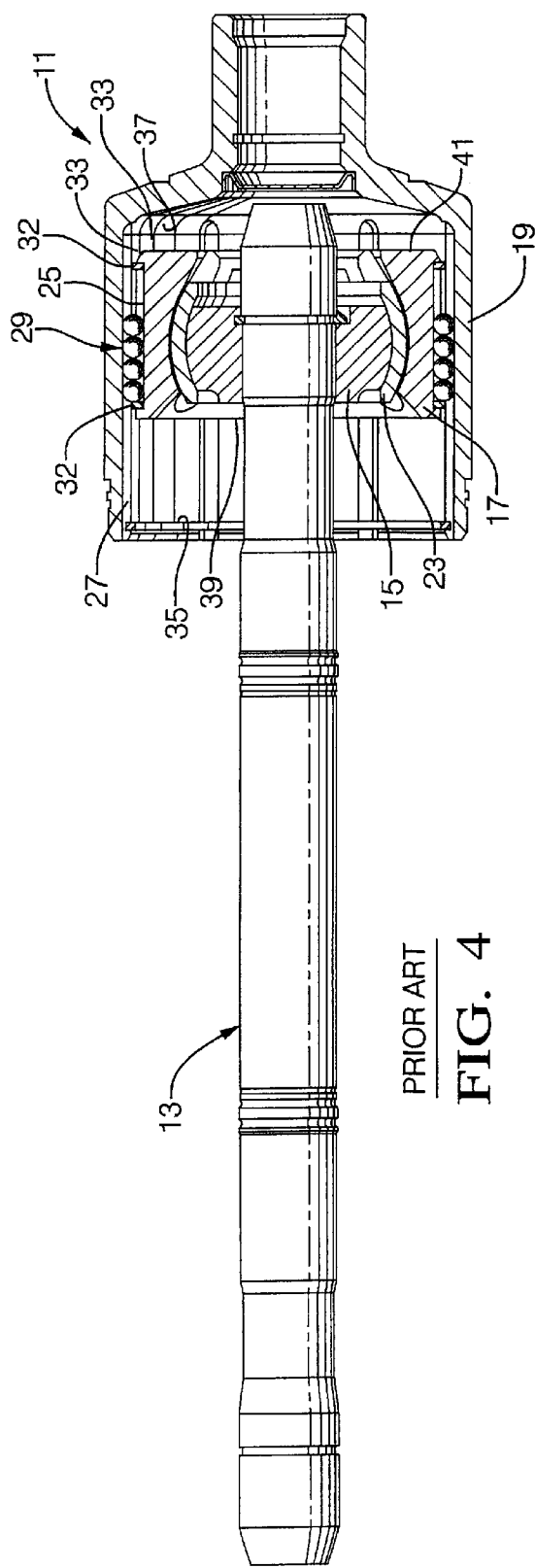
PRIOR ART
FIG. 3
PRIOR ART
FIG. 4

CONSTANT VELOCITY STROKING JOINT

BACKGROUND OF THE INVENTION

1. Technical Field

This invention relates to constant velocity stroking joints.

2. Related Art

Constant velocity ("CV") joints have particular application in front wheel drive systems for automotive vehicles. Power is transmitted from the transmission to the drive wheels via shaft assemblies. The shaft assemblies include CV joints at their inboard and outboard ends. The inboard CV joint is coupled to the transmission and the outer CV joint is coupled to the drive wheels. During normal operation of a front wheel drive vehicle, the wheels move up and down, and thus provision must be made for both angular and axial movement of the shaft assembly.

In a typical front wheel drive system, the outboard CV joints are designed to accommodate large joint angularity, but no axial stroking. The inboard CV joints are designed to accommodate axial stroking and joint angularity. The present invention is concerned with the stroking type CV joints. FIGS. 1–3 illustrate a prior art CV stroking joint which is commonly referred to the industry as a "ball spline Rzeppa joint". The joint 11 includes a half shaft 13 splined to one end of which is an inner race 15 accommodated within an intermediate race 17 which in turn is disposed within an outer race 19. A plurality of balls 21 are carried in ball grooves between end inner race 15 and intermediate race 17 and are captured within windows of a ball cage 23 to provide angular or pivotal movement of the inner race 15 and thus the shaft 13 relative to the intermediate and outer races 17, 19, respectively. Axial or plunging movement of the joint 11 is provided between the intermediate race 17 and outer race 19.

The intermediate race 17 is formed on its outer surface with a plurality of axial ball guides 25 that correspond in number and alignment with ball guides 27 formed on the inner surface of the outer race 19. A row of spline balls 29 is disposed in each of the aligned ball guides 25, 27 to provide rolling support of the intermediate race 17 within the outer race 19. Referring to FIGS. 2–4, it will be seen that the outer surface of the intermediate race 17 is formed with a pair of retaining ring grooves 31 adjacent it opposite axial ends, and that the spline balls 29 are captured between retaining rings 32 within the grooves 31 and thus cannot move beyond the ends of the intermediate race 17.

It will be appreciated thus from FIGS. 3 and 4 that the space between the retaining rings 32 is greater than the space occupied by the spline balls 29, such that there is a certain amount of open space to accommodate free rolling movement of the spline balls as the intermediate race 17 is moved axially relative to the outer race 19. FIG. 3 shows the joint 11 with the intermediate race 17 moved to the forward limit (to the left in the drawings) of free rolling stroke of the intermediate race 17 within the outer race 19. It will be seen that the spline balls 29 are confronting the rearward retaining ring (to the right in FIG. 3) and thus are no longer free to roll in the ball guides in response to additional forward axial movement of the intermediate race 17 to the left in FIG. 3. FIG. 4 shows the opposite extreme of inward free rolling stroke of the intermediate race 17 relative to the outer race 19. It will be seen that in each case of the free rolling limit, there remains an axial gap or space 33 between end stops 35, 37 of the outer race 19, and corresponding end stops 39, 41 of the intermediate race 17 which provides for additional forward and rearward axial displacement or stroking of the intermediate race 17 within the outer race 19. In practice, the joint 11 operates in the zone of free rolling stroke until such point as the extreme free stroke limits are reached, as shown in FIGS. 3 and 4. If a sufficient axial stroking force is applied to the joint 11, additional axial displacement or stroking of the intermediate race 17 occurs to close the forward or rearward gap 33, but such requires the balls 21 to slide or skid along the ball guides 27 of the outer race 19 rather than rolling, as they are restrained against rolling by confrontation with the retaining rings of the intermediate race 17.

It is an object of the present invention to improve upon such joints by increasing the free rolling travel or displacement of the intermediate race within the outer race.

SUMMARY OF THE INVENTION

A constant velocity stroking joint constructed according to the invention includes an outer race having a plurality of axially extending ball channels. An inner race is disposed within the outer race and an intermediate race is disposed between the inner and outer races and supports the inner race for angular pivotal movement relative to the outer race. The intermediate race is formed on its outer surface with a plurality of axially extending ball channels aligned with the ball channels of the outer race. The intermediate race has opposite axial ends and abutments positioned to confront the end stops of the outer race at extreme limits of axial stroking of the intermediate race within the outer race. Axially extending rows of spline balls are disposed between the intermediate race and the outer race in registry with the aligned ball channels to provide rolling support to the intermediate race during the axial stroking within the outer race. According the invention, the rows of spline balls are supported to extend beyond the ends of the intermediate race in such manner as to provide free rolling guidance of the spline balls during the axial stroking the intermediate race between the extreme limits of axial stroking of the intermediate race within the outer race.

The invention thus has the advantage of providing free rolling support to the intermediate race during its full travel within the outer race. Such support of the spline balls eliminates or greatly minimizes any sliding or skidding movement of the spline balls as with the prior art device described above.

Eliminating the skidding of the spine balls provides for a smoother, quieter CV joint and eliminates any shutter or vibrations which may be associated with such skidding of the balls inherent in the prior art constructions.

Providing full free rolling support of the balls during the full stroke of the intermediate race has the further advantage of prolonging the operating life of the joint by decreasing wear on the spline balls and associated ball channels attributed to skidding action of the spline balls.

THE DRAWINGS

These and other advantages and features of the present invention will become more readily appreciated as the same becomes better understood with reference to the following detailed description and appended drawings, wherein:

FIG. 1 is an exploded perspective view of a prior art constant velocity joint;

FIG. 2 is an assembled perspective view, shown partly in section, of the prior joint of FIG. 1;

FIGS. 3 and 4 are cross-sectional views depicting the prior art joint of FIGS. 1 and 2 shown in the limits of free rolling travel of the spline balls;

DETAILED DESCRIPTION

Figures 5, 6:
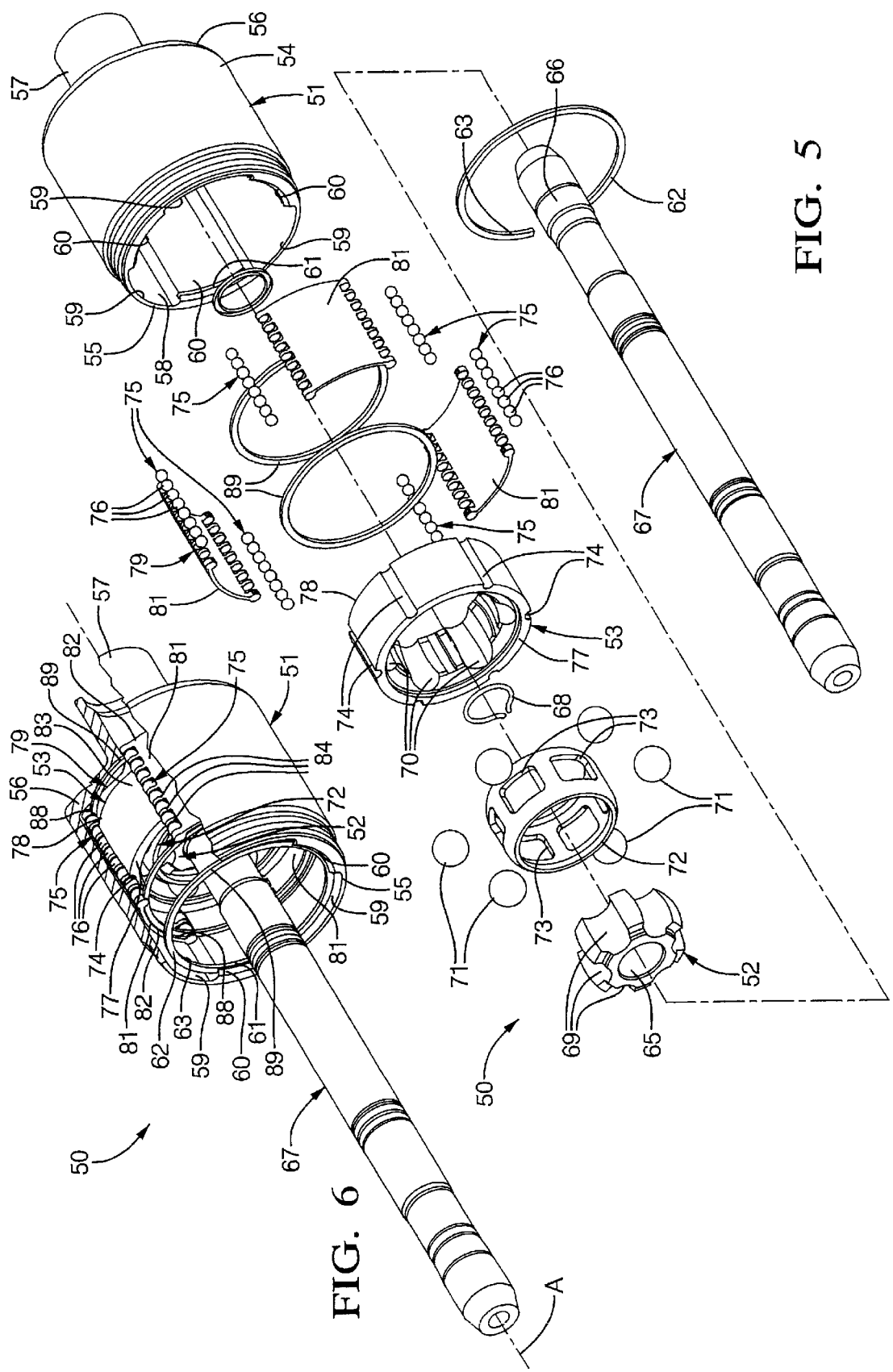
FIG. 5 is an exploded perspective view of a constant velocity joint constructed according to a presently preferred embodiment of the invention.
FIG. 6 is an assembled perspective view of the joint of FIG. 5 shown partly in section.

A constant velocity rzeppa-type ball spline stroking joint assembly constructed according to a presently preferred embodiment of the invention is shown generally at 50 in FIGS. 5–10.

The assembly 50 includes an outer race 51, an inner race 52, and an intermediate race 53.

The outer race 51 has a cup-shaped configuration with a cylindrical side wall 54 extending along a longitudinal axis A of the assembly 50 between an open end 55 of the outer race 51, and an axially opposite closed end provided by an end wall 56 from which a stub shaft or sleeve 57 extends. The side wall 54 has an inner surface 58 formed with a plurality of ball channels 59 that are preferably linear and extend in the axial direction A of the assembly 50. Adjacent ball channels 59 are separated by land regions 60 that are formed adjacent the open end 55 with a retaining ring groove 61 in which a retaining ring 62 is disposed which extends into the ball channels 59 to define an axially forward or axially outward end stop or shoulder 63. The end wall 56 defines a rearward or axially inward end stop surface of the outer race 51.

The inner race 52 is disposed within the intermediate race 53, and the intermediate race in turn is disposed within the outer race 51. The inner race 52 includes a spline bore 65 that is received on an externally splined section 66 of a half shaft 67 and secured by a snap ring 68. The inner race 52 is formed on its outer surface with a plurality of ball grooves 69 in known manner which align with corresponding ball grooves 70 formed on the inner surface of the intermediate race 53 to define ball guides in which a plurality of spherical balls 71 are received, with one ball provided in each ball guide. A ball cage 72 is disposed between the inner race 52 and intermediate race 53 and has windows 73 in which the balls 71 are accommodated. The inner race 52, ball cage 72, and intermediate race 53 have complimenting spherical or part-spherical surfaces which cooperate in well known manner such that the inner race 52, and thus the shaft 67, is able to pivot with free full angular movement relative to the intermediate race 53 and the outer race 51 to provide for the angular component of movement of the joint assembly 50. The joint assembly 50 further includes an axial stroking or plunging component of movement enabling the shaft 67 to move axially relative to the outer race 51 which will be described below.

To provide for axial stroking or plunging movement, the intermediate race 53 is formed on its outer surface with a plurality of ball channels 74 that extend axially of the intermediate race 53 and preferably linearly in parallel relation to the longitudinal axis A of the joint assembly 50. The ball channels 74 are arranged to align with the ball channels 59 of the outer race 51. For reasons which will become apparent below, there are two ball channels 74 for every one ball channel 59 of the outer race 51. The ball channels 59 of the outer race 51 are considerably wider and span the distance between two adjacent ball channels 74 of the intermediate race 53.

Figure 9:
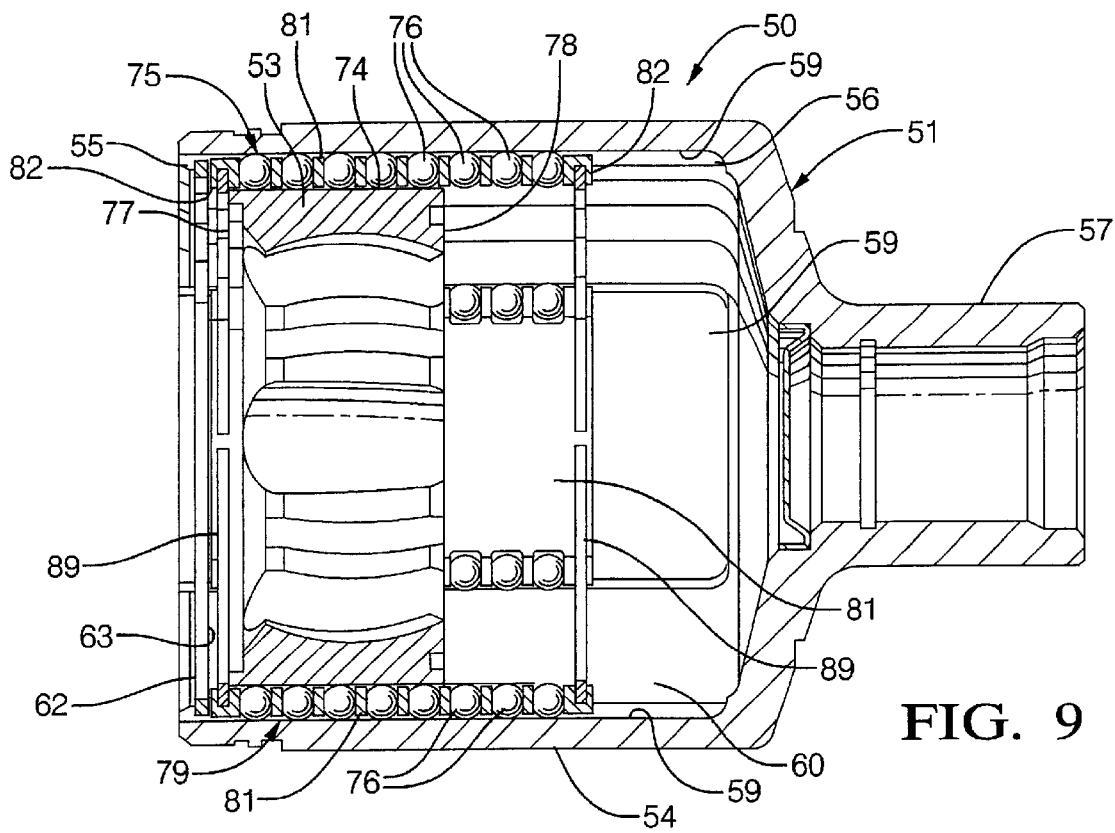
FIGS. 9 and 10 are cross-sectional views of the joint of FIGS. 5 and 6 shown in the extreme limits of axial stroking.
Figure 10:
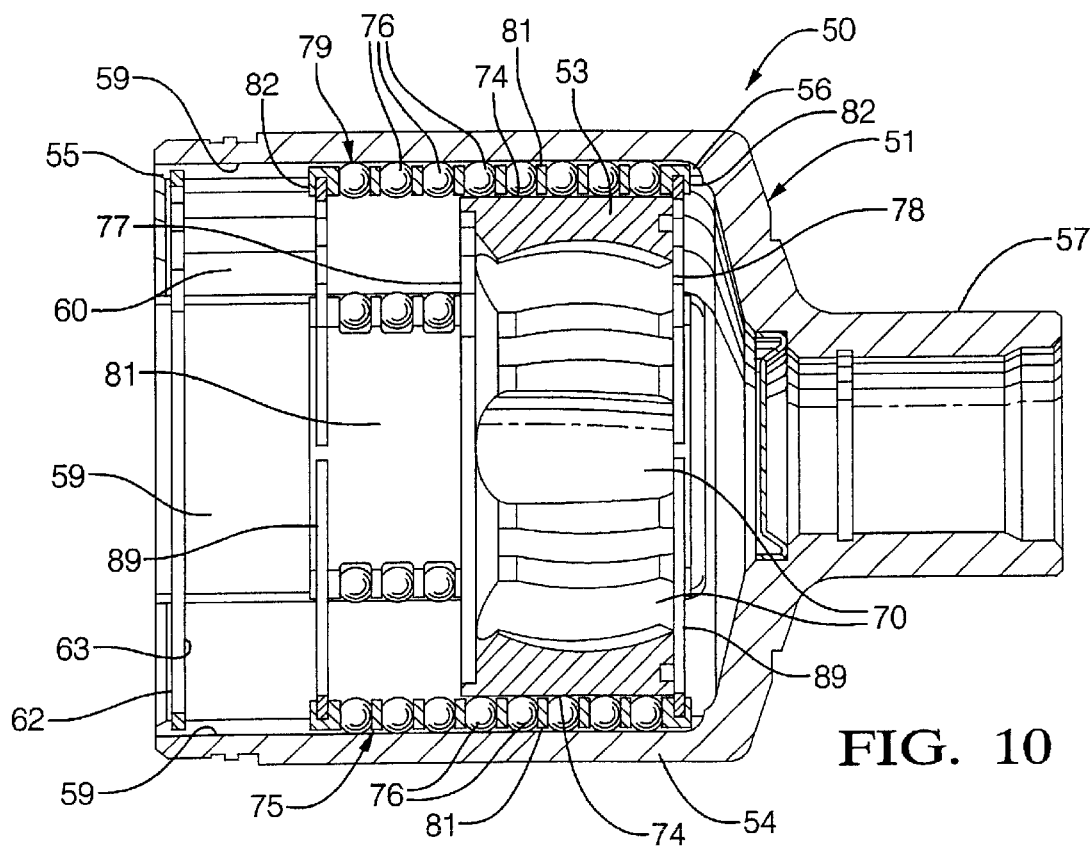

The assembly 50 includes a plurality of axially extending rows 75 of spline balls 76. The rows 75 extend preferably linearly in the direction of the longitudinal axis A of the assembly 50. The rows of spline balls 76 are disposed between the intermediate race 53 and outer race 51 in registry with the aligned ball channels 59, 74. As best shown in FIGS. 6, 9, and 10, the axial length of the rows 75 (i.e., the distance between the end-most spline balls 76 and each row 75) is greater than the axial length of the intermediate race 53 as measured between axially opposite end faces 77, 78 of the intermediate race 53. As such, the rows 75 of spline balls 76 are supported within the outer race 51 so as to extend beyond the end faces 77, 78 of the intermediate race 53. However, the length of the rows 75 is less than the distance between the end stops 56, 63 of the outer race 51. As will be explained in greater detail below, such arrangement and support of the spline balls 76 enables the intermediate race 53 to stroke the full distance within the inner race 52 between the end stops 56, 63 with free rolling of the spline balls 76 along the full stroke.

The rows 75 of spline balls 76 are arranged in such a way that they do not rely for support within the outer race 51 on the intermediate race 53. The assembly 50 includes a ball spline cage 79 which supports the rows 75 of spline balls 76 independently of the intermediate race 53. The ball spline cage 79 includes a plurality of ball sockets 80 which capture and support the spline balls 76, without assistance from the intermediate cage 53, within the outer race 51.

Figure 7:
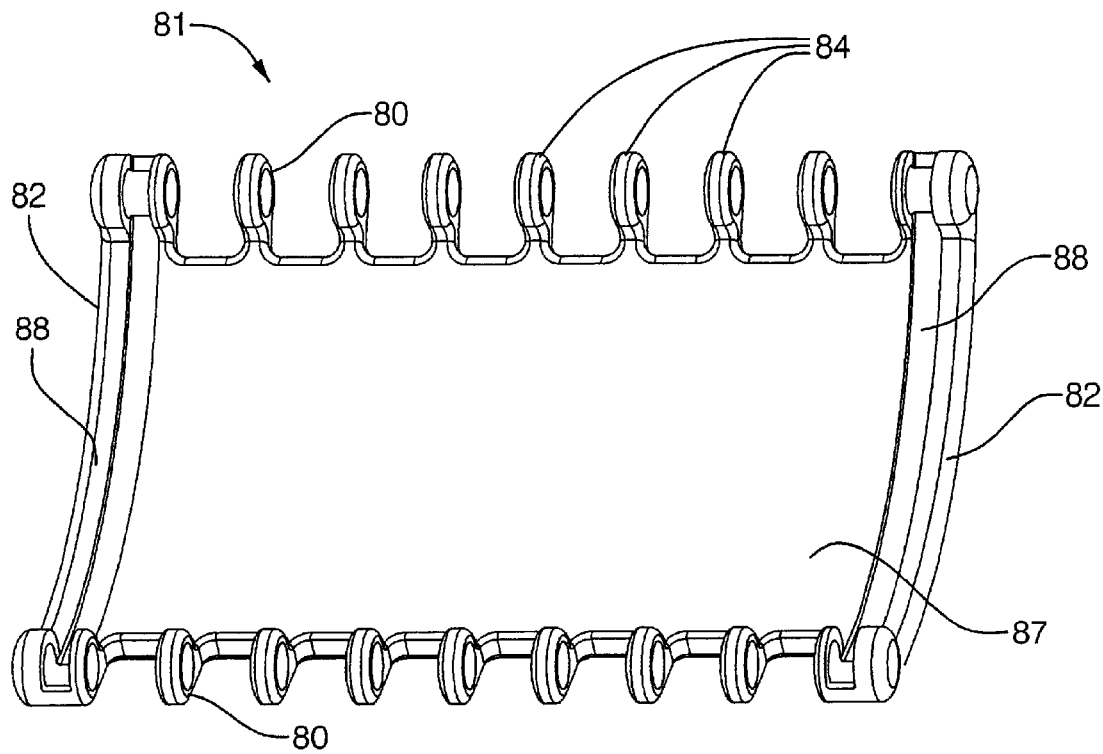
FIG. 7 is a top perspective view of a ball cage section.
Figure 8:
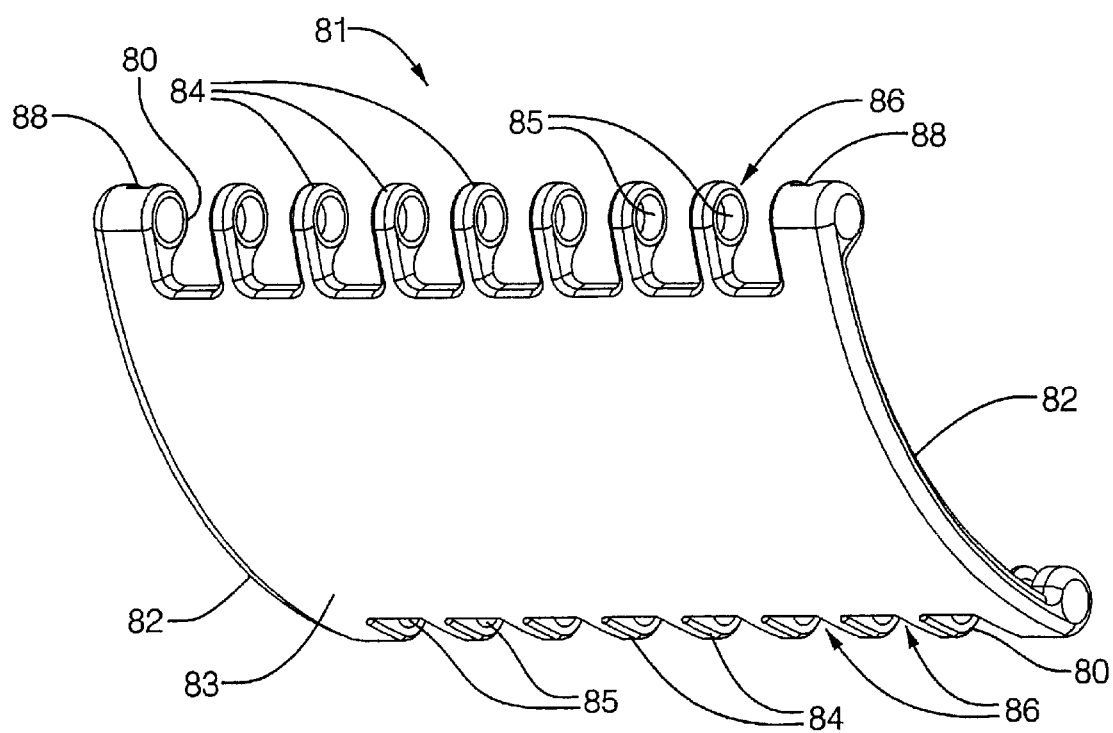
FIG. 8 is a bottom perspective view of the ball cage section of FIG. 7.

The ball spline cage 79 preferably is constructed from a plurality of ball cage sections 81 which are preferably constructed as separate components that are shown best in FIGS. 6 and 7. Each cage section 81 includes opposite axial ends 82 and an outer convex surface 83. The opposite side edges of the cage sections 81 are formed with a plurality of fingers 84 which are spaced apart in the axial direction A of the assembly 50 and have facing surfaces formed with a circular recess or cup 85 defining, between each set of fingers 84, a ball socket 86 sized to receive and support the spline balls 76 for free rolling movement with the socket 86 while retained for support by the fingers 84. Preferably, the cage sections 81 are fabricated of a metal or plastics material such as glass filled nylon and the fingers 84 are sufficiently elastically deformable to receive an oversized spline ball 76 into the space between adjacent fingers which spread apart to accommodate receiving the spline balls 76 into the sockets 86 after which the fingers 84 spring back to their original position to retain the spline balls 76 captured by the cage sections 81. As will be appreciated from the drawings, each cage section 81 supports two rows 75 of the spline balls 76 along its opposite edges in laterally spaced, parallel relation in the direction of axis A.

The individual cage sections and their double rows 75 of spline balls 76 are sized for accommodation within the ball channels 59 of the outer race 51, with the balls 76 projecting slightly beyond the outer surface of the cage sections 81 such that the cage sections 81 are supported for rolling axial movement along ball channels 59 in the axial direction A.

A concave inner surface 87 of the cage sections 81 is formed at its axially opposite ends 82 with a retaining ring groove 88 in which a pair of retaining rings 89 are received to join the cage sections 81 together and support them within the ball channels 59 of the outer race 51 independently of any support provided by the intermediate race 53. In other words, the rows 75 of spline balls 76 do not rely for support within the outer race 51 on the intermediate race 53, but rather are supported by the cage sections 81 and retaining rings 89. Each row 75 of spline balls 76 along the opposite side edges of the cage sections 81 is received in a corresponding one of the ball grooves 74 of the intermediate race 53. As such, there are twice as many ball grooves 74 in the intermediate race 53 as they are ball grooves 59 in the outer race 51. As will be appreciated from FIG. 6, the retaining rings 89 of the ball spline cage 79 are spaced axially outwardly of the end faces 77, 78 of the intermediate race 53.

In operation, the shaft 67 and inner race 52 is supported by the intermediate race 53 for free angular pivotal movement relative to the outer race 51. The intermediate race 53, and thus the inner race 52 and ball cage 72, are supported by the spline balls 76 for relative axial plunging movement in the direction of axis A relative to the outer race 51. As shown best in FIGS. 9 and 10, as an axial inward or outward force is placed on the shaft 67, the intermediate race 53 is permitted to stroke axially in one direction or the other toward the end stops 56, 63 of the outer race 51, and is supported along the full stroke length by the free rolling spline balls 76. As the intermediate race 53 is displaced axially, the rolling spline balls 76 displace the ball spline cage 79 axially relative to the outer race 51. The length of the ball spline cage 79 and the row 75 of spline balls 76 is selected such that over the full stroke of the intermediate race 53 within the outer race 51 the balls 76 are free rolling. According, the ball spline cage 79 is free floating in the axial direction relative to the outer race 51 and intermediate race 53 and is sized such that the ends 82 of the cage sections 81 confront the end stops 56, 63 at approximately the same time as the abutments 77, 78 and the intermediate race 53 confront the end stops 56, 63 or the retaining rings of the ball spline cage.

The disclosed embodiment is representative of a presently preferred form of the invention, but is intended to be illustrative rather than definitive thereof. The invention is defined in the claims.

What is claimed is:

1. A constant velocity stroking joint assembly, comprising:

an outer race having a plurality of axially extending ball channels and axially spaced end stops;

an inner race disposed within said outer race;

an intermediate race disposed between said inner race and said outer race and supporting said inner race for angular pivotal movements relative to said outer race, said intermediate race having an outer surface extending between opposite axial ends of said intermediate race and formed with a plurality of axially extending ball channels aligned with said ball channels of said outer race, and abutments positioned to operatively confront said end stops of said outer race at extreme limits of axial stroking of said intermediate race within said outer race;

axially extending rows of spline balls disposed between said intermediate race and said outer race in registry with said aligned ball channels to provide rolling support to said intermediate race during said axial stroking; and wherein said rows of said spline balls are supported to extend beyond said ends of said intermediate race to provide free rolling guidance of said spline balls during said axial stroking of said intermediate race between said extreme limits of axial stroke of said intermediate race within said outer race.

2. The assembly of claim 1 including a ball spline cage disposed between said intermediate race and said outer race.

3. The assembly of claim 2 wherein said ball spline cage supports said rows of said spline balls within said outer race.

4. The assembly of claim 3 wherein said support of said spline balls is independent from said intermediate race.

5. The assembly of claim 3 wherein said ball spline cage includes ball sockets capturing and supporting said spline balls for rolling movement independently of said intermediate race.

6. The assembly of claim 5 wherein said ball sockets provide individual support to said spline balls.

7. The assembly of claim 2 wherein said ball spline cage is supported for axial floating movement relative to said outer race and said intermediate race.

8. The assembly of claim 2 wherein said ball spline cage includes a plurality of cage sections disposed in said ball channels of said outer race.

9. The assembly of claim 8 wherein said cage sections are coupled by at least one retaining ring.

10. The assembly of claim 9 wherein said retaining rings are positioned to confront said end stops of said outer race and to be confronted by said abutments of said intermediate race when said intermediate race is moved to said extreme limits of axial stroke.

11. The assembly of claim 8 wherein said cage sections are formed on an inner surface with a retaining ring groove adjacent opposite axial ends of said cage sections, and including a pair of retaining rings disposed in said grooves and supporting said cage sections within said ball channels of said outer race independently of said intermediate race.

12. The assembly of claim 8 wherein each of said cage sections supports two of said rows of said spline balls in laterally spaced relation to one another.

13. The assembly of claim 1 wherein said ball cage extends axially beyond said ends of said intermediate race.

14. The assembly of claim 1 wherein there are two of said ball channels of said intermediate race corresponding and aligned with each one of said ball channels of said outer race.

* * * * *